United States Patent

[11] 3,593,042

[72] Inventor Charles R. Cook, Jr.
North Palm Beach, Fla.
[21] Appl. No. 761,407
[22] Filed Sept. 23, 1968
[45] Patented July 13, 1971
[73] Assignee International Telephone and Telegraph Corporation

[54] R. F. COUPLED LINE RECEIVER WITH D. C. ISOLATION
9 Claims, 5 Drawing Figs.

[52] U.S. Cl. 307/261, 328/36, 331/71, 331/108 B
[51] Int. Cl. H03k 5/00
[50] Field of Search 307/261, 270, 303; 328/26, 36, 27, 165; 331/71

[56] References Cited
UNITED STATES PATENTS

| | | | |
|---|---|---|---|
| 2,056,824 | 10/1936 | Cawley | 328/26 X |
| 3,320,409 | 5/1967 | Larrowe | 235/197 X |
| 3,391,249 | 7/1968 | Becker et al. | 328/135 X |

*Primary Examiner*—Roy Lake
*Assistant Examiner*—James B. Mullins
*Attorneys*—C. Cornell Remsen, Jr., Walter J. Baum, Percy P. Lantzy, Philip M. Bolton, Isidore Togut and Charles L. Johnson, Jr.

ABSTRACT: This is an electric circuit for receiving and converting a digital signal to a sinusoidal RF signal in one section of the circuit. This converted signal is then coupled to a second section of the circuit which is DC electrically isolated from the first section wherein said signal is then converted to its original form. Since each circuit section has a separate DC ground reference, the noise immunity of the overall circuit is improved.

INVENTOR
CHARLES COOK, JR.
BY
ATTORNEY

INVENTOR
CHARLES COOK, JR.
BY
ATTORNEY

R. F. COUPLED LINE RECEIVER WITH D. C. ISOLATION

BACKGROUND OF THE INVENTION

This invention relates to a circuit for receiving high speed digital information having improved noise immunity characteristics.

The three major problems associated with the high speed transmission of digital information are crosstalk, reflection and noise. Crosstalk can be controlled by the geometrical layout of the system, while reflection can be controlled by varying the impedance termination of the system's transmission lines. The noise cannot be as easily controlled and its effects may only be reduced by improving the noise immunity of the transmitting and receiving circuitry. The system noise can be categorized as having an AC and DC components. The AC noise can be filtered by the transmission lines or by adding an external capacitance of approximately 100 pf. across the input of the receiving circuit. One method of reducing DC noise in the receiving system is to provide DC ground isolation between the input and output of the receiving circuit. Prior art methods of providing such isolation are typically relay activated devices and isolation transformers. The disadvantages of using relays or transformers are that they are limited to low frequency use and their large size makes their adaptability to integrate circuits difficult.

SUMMARY OF THE INVENTION

It is an obiect of this invention to provide for a digital transmission receiving circuit having improved noise immunity by providing DC isolation between the input and output of the receiving circuitry.

It is another object of this invention to use circuit means to provide DC isolation which will enable the circuit to be adaptable to monolithic circuits.

A further object of this invention is to provide for improved means to detect an RF signal.

According to a broad aspect of this invention there is provided a circuit arrangement for eliminating noise from the given circuit comprising means for receiving a digital signal and converting said digital signal to an RF signal, said means having a first ground reference, means for reconverting said RF signal to said digital signal, said means having a second ground reference isolated from said first ground reference, means to couple said receiving means to said reconverting means, and amplifying means coupled to said reconverting means, said amplifying means having the same ground reference as said reconverting means, whereby the signal to noise ratio of said receiving circuit is improved by having the ground reference for said digital input signal DC electrically isolated from the ground reference for said digital output signal.

Another feature of this invention is provided by having said receiving means utilize an oscillator circuit wherein said digital signal activates said oscillator by operating by the source of power for said oscillator.

According to another aspect of this invention there is provided a detector circuit comprised of a first and second transistor each having an emitter, base and collector, said first emitter and base being connected across the input to said detector, said first emitter being connected to said second base and said first base being connected to said second emitter, said first collector being connected to said second collector, said second collector being connected to a supply voltage through a resistor, the output of said detector being obtained across said collector and emitter of said second transistor so that when an RF signal is applied across the input of said detector circuit, said second transistor is always on and in the absence of said RF signal, said transistor turns off.

DESCRIPTION OF THE PREFERRED EMBODIMENTS

Figure 1:
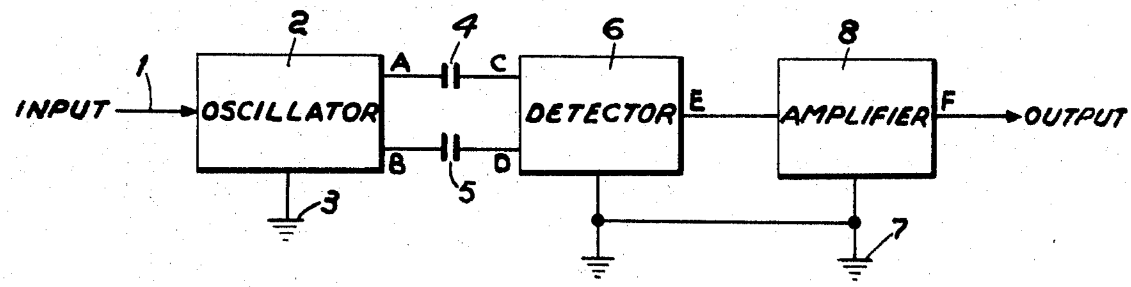
FIG. 1 shows a block diagram of the digital receiving circuit described in this application.

A block diagram of an oscillating line receiver circuit is shown in FIG. 1, wherein a digital input signal 1 is fed into an oscillator 2. The oscillator ground 3 is connected to the transmission circuitry. The digital input signal is converted to an RF signal wherein the RF signal appears across output terminals A and B of the oscillator circuit.

The RF signal is coupled through capacitors 4 and 5 to inputs C and D of detector circuit 6. Capacitors 4 and 5 are approximately 10 pf. or less in value and are used primarily to provide DC isolation between the oscillator ground 3 and the detector ground 7. The extent of DC isolation provided by capacitors 4 and 5 is determined by the breakdown voltage of either capacitor.

Detector 6 receives the RF signal and converts it to a digital signal. This digital signal appears at the detector output E and is fed into amplifier 8. The output of amplifier 8 is taken between F and ground 7. It is seen that the ground for the amplifier is the same as the ground for the detector. The amplifier output thus produces a digital signal which is in phase with the digital signal applied to the input of oscillator 2.

We have thus obtained a digital signal from amplifier 8 which has an improved signal to noise ratio due to the DC isolation between the oscillator circuitry and the detector and amplifier circuitry. This is accomplished by taking a digital signal, for example, approximately 1 mHz, and converting it to an RF signal of approximately 40 to 100 mHz. The RF generated signal is coupled to the detector circuit through the capacitors while the lower frequency digital input signal, along with DC noise and AC noise below the frequency of the RF generated signal, is blocked by these capacitors thus providing DC isolation between the input digital signal and the detected RF signal. The fact that the coupling capacitor can be 10 pf. or less and the remaining circuitry is comprised of resistors, diodes and transistors renders this circuit approach adaptable for integrated circuits. It is clearly seen that by increasing the frequency of the oscillator circuit and further decreasing the capacitance of the coupling capacitors, we can further decrease the noise in the circuit, since a smaller coupling capacitor will provide a greater impedance for DC and AC noise, while easily passing the higher frequency RF generated signals.

Figure 2:
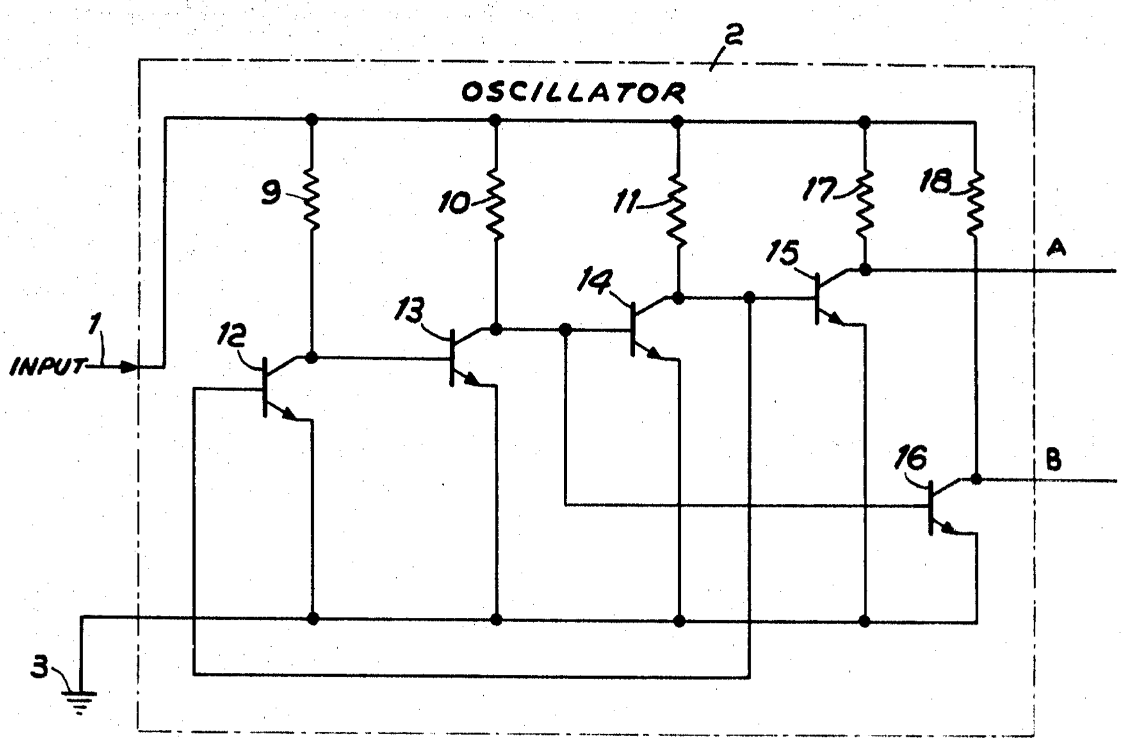
FIG. 2 is a circuit diagram of the oscillator shown in FIG. 1.

Additional noise rejection features of this system can be observed by analyzing the oscillator circuit shown in FIG. 2. It is seen that the digital input signal is applied between input 1 and circuit ground 3. As can be seen from observing FIG. 2 the input signal in the oscillator happens to be the source of power for activating said oscillator. Transistors 12, 13 and 14 are connected to the source of power through collector resistors 9, 10 and 11 respectively, while the emitter of each of the transistors is connected to ground. With the collector of transistor 12 connected to the base of 13, the collector of transistor 13 connected to the base of transistor 14 and the collector of transistor 14 connected to the base of transistor 12, the basic oscillator circuit is established. When the digital signal of sufficient voltage level is applied to the circuit, the circuit will oscillate at a high RF frequency due to the positive feedback path existing between the collector of transistor 14 and the base of collector 12. Transistors 15 and 16 are used to amplify the oscillating signal so as to increase the output voltage swing of the oscillating signal at the output of the oscillator. The collector of transistor 14 is connected to the base of transistor 15 and the collector of transistor 13 is connected to the base of transistor 16. The emitters of transistors 15 and 16 have the same common oscillator ground while the collectors of transistors 15 and 16 are connected to the same oscillator supply through resistors 17 and 18 respectively. Thus, the outputs of the amplifiers are then established at the collector of transistor 15 at terminal A and at the collector of transistor 16 at terminal B wherein the oscillator output is taken across terminals A and B where the two out of phase signals from the oscillator circuit appear. This out of phase relationship further increases the potential difference between terminals A and B and thus increases the signal applied to the detector circuit.

The main advantage of using this oscillator circuit arises from the fact that the oscillator power is supplied by the digital input circuit thereby eliminating the noise which might enter this system from the supply voltage. Furthermore, a common mode input to the oscillator is established, thus the oscillator circuit will only recognize differential input signals and will reject all common mode noise which will appear on both input transmission lines. Typical component values for the oscillator are 1 kΩ for resistive components 9, 10 and 11 and 330Ω for resistive components 17 and 18, with the selected transistors having an $f_T$ (frequency response) of at least 400 mHz. In the monolithic integrated circuit version of this oscillator circuit, the transistors can have an $f_T$ as high as *1* kmHz. and with the elimination of stray wire capacitance, we would achieve higher oscillating frequencies which would permit the use of smaller coupling capacitors and thus increase DC and AC noise rejection.

Figure 3A:
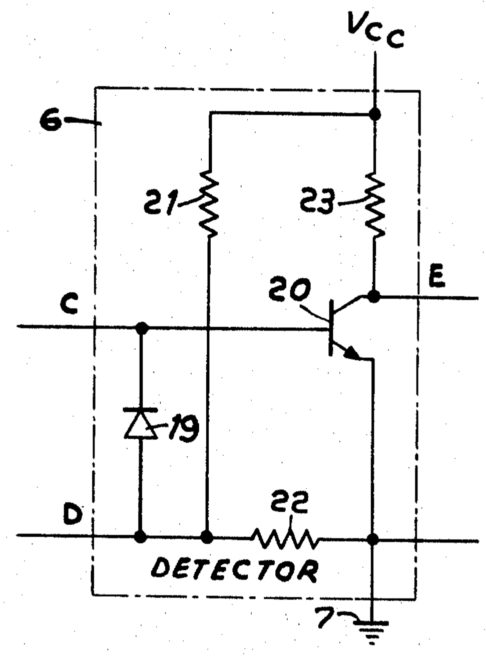
FIGS. 3*a* and 3*b* are two circuit embodiments of the detector shown in FIG. 1.

The detector circuit must now receive the RF signal across the detector input at points C and D and convert it to a digital signal. FIG. 3*a* is one embodiment of the detector used which can accomplish this purpose. Rectifying means, such as diode 19, is placed across the input wherein the cathode of the diode 19 is attached to the base of output transistor 20. The collector of output transistor 20 is connected to a supply voltage through resistor 23. A typical supply voltage used is about 5 volts and resistor 23 can have a typical value around 6 kΩ. The bias for the detector circuit is determined by the resistor elements 21 and 22, which form a voltage divider and place a positive bias at the anode of diode 19. A typical value for resistor 21 is 1.9 kΩ and resistor 22 is 120Ω. When the RF signal is applied across input terminals C and D of the detector and as soon as the voltage at C becomes more positive than the bias voltage at D, diode 19 is reversed biased and the emitter base diode of transistor 22 starts to become forward biased. As soon as the threshold voltage of the emitter base diode of transistor 20 is reached, transistor 20 turns on and the output voltage of the detector at point E falls approximately to the voltage level of ground 7, ground 7 being separate and isolated from ground 3 of the oscillator circuitry. Now, when C becomes negative with respect to D and diode 19 conducts, the emitter base junction of transistor 20 is no longer forward biased and transistor 20 tends to start to turn off. The voltage at the collector will remain low for the period of time it takes to supply the charge to the collector through resistor 23. Before it has time to do this the transistor is turned on again. Thus, transistor 20 tends to remain in the on condition as long as the RF oscillating signal appears across the input of the detector circuit. As soon as there is no input signal to the oscillator circuit and therefore no high frequency RF signal appearing across points C and D, transistor 20 turns off and point E of the detector rises to the voltage level of V*cc*.

Figure 3B:
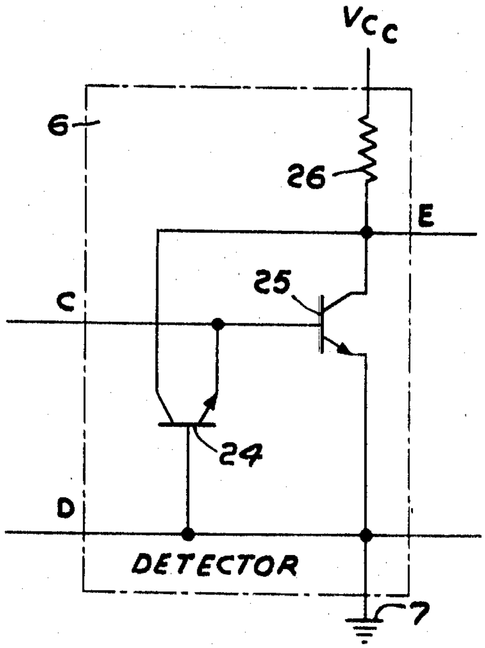

The embodiment of the detector circuit shown in FIG. 3*b* can make the detector operate twice as efficiently as the one in FIG. 3*a*. This is accomplished by replacing the input diode 19 with an input transistor 24 wherein the emitter base diode of transistor 24 is connected across inputs C and D, the emitter of transistor 24 being connected to the base of output transistor 25 and the base of transistor 24 and the emitter of transistor 25 being connected to ground 7. The collector of transistor 24 is connected to the collector of transistor 25 which in turn is connected to supply voltage V*cc* through resistor 26. The output of the detector is taken from point E which is connected to the collector of transistor 25 to ground 7.

The basic difference in operation of this circuit shown in FIG. 3*b* over the circuit shown in FIG. 3*a* is that transistors 24 and 25 together are on twice as long as the single transistor 20 in FIG. 3*a*.

This is accomplished as follows. When C is positive with respect to D, the emitter-base diode of transistor 24 is reversed biased and the emitter-base diode of transistor 25 becomes forward biased, thereby turning transistor 25 on. When C becomes negative with respect to D, the emitter-base diode of transistor 24 becomes forward biased and current flows from the collector to the emitter of transistor 24. This current then flows from the base to the emitter of transistor 25 which keeps transistor 25 in the on condition through both half cycles of the oscillating signal appearing across the detector input terminals C and D. Of course, the output at point E across transistor 25 again rises to V*cc* when the oscillating signal across C and D is no longer present.

Figure 4:
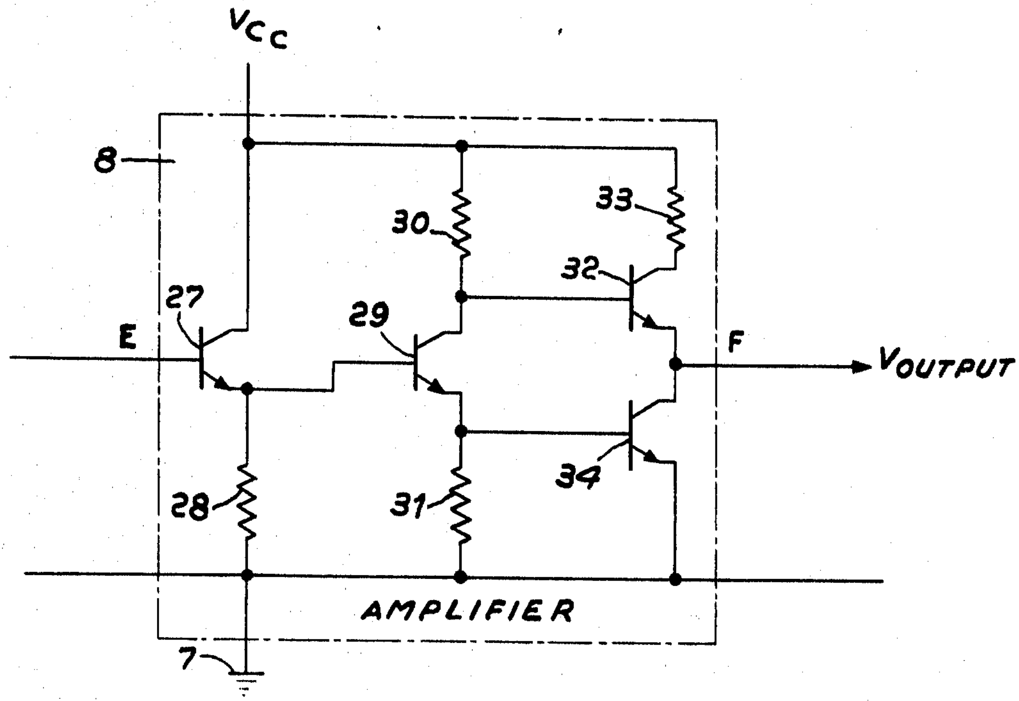
FIG. 4 is a circuit for the amplifier shown in FIG. 1.

The detected signal is then applied to the input of an amplifier circuit such as that shown in FIG. 4. The first stage of the amplifier circuit is an emitter follower which prevent the detector circuit from being loaded down. The emitter follower is comprised of transistor 27, the base of which is coupled to output E of the detector, the collector being connected to the V*cc* supply voltage and the emitter being connected to the resistor 28. Resistor 28 is then connected to amplifier detector ground 7. A suitable value for this resistor can be in approximately 3kΩ. The emitter follower output is then taken across resistor 28 and ground 7 and is fed into the base of transistor 29. The collector of transistor 29 is connected to V*cc* through an appropriate resistor 30 of approximately 2kΩ. The emitter of transistor 29 is then connected to circuit ground 7 through resistor 31 of approximately 2 kΩ. The collector of transistor 29 is connected to the base of transistor 32 and the emitter of transistor 29 is connected to the base of transistor 34. The emitter of transistor 34 is connected to the circuit ground while the collector of transistor 34 is connected to the emitter of transistor 32. The collector of transistor 32 is connected to the V*cc* through resistor 33. The circuit output is obtained between point F and ground. When the digital input signal is received by the oscillator circuit, the detector circuit detects an RF signal and converts it to a ground output. The detector output is applied to the input of the amplifier circuit and a ground signal appears across resistor 28 and the ground signal also appears across resistor 31 which in turn keeps transistors 27, 29 and 34 in the off condition. Therefore, transistor 32 is driven on and a positive signal is then delivered across output F and ground. We thus see that the output of the amplifier has produced a signal which is in phase with the input digital signal which is applied to the oscillator signal. The purpose of transistor 32 is to enable the amplifier to operate at high fan-out, i.e. capable of driving a number of resistor transistor logic, diode transistor logic, and transistor logic circuits at one time.

It is thus seen that this overall circuit and system is quite adaptable for use in interface circuitry for computers where high-speed digital information is being sent between memory banks and the computer over long transmission lines. This circuit has the advantage of responding only to differential input signals while rejecting common mode noise. The component values mentioned in the above circuits are not at all critical for the operation of the circuit.

It would of course be most advantageous that the oscillator RF frequency generated have as high a frequency of oscillation as possible, since the coupling capacitance can then be made small enough to block all DC and lower frequency AC noise and only allow the very high RF generated frequency to pass and be detected by the detector circuit. The oscillator circuit can then be made immune to higher AC frequency noise by appropriate filtering at the input to the oscillator circuit, thereby successfully immunizing this system from AC and DC noise.

I claim:

1. A circuit arrangement for eliminating noise from a given signal comprising:

means for receiving a digital signal and converting said digital signal to an RF signal, said means having a first and second input and a first and second output terminal, the first input terminal of said receiving means representing a first DC ground reference;

means for reconverting said RF signal to said digital signal, said reconverting means having a first and second input and a first and second output terminal, the first output terminal of said reconverting means representing a second DC ground reference; and means to couple said receiving means to said reconverting means, whereby the signal to noise ratio of said receiving circuit is improved by having the ground reference for said received digital signal DC electrically isolated from the ground reference for said reconverted digital signal.

2. A circuit arrangement according to claim 1 wherein said receiving means is an oscillator circuit, and said digital signal activates said oscillator by operating as the source of power for said oscillator.

3. A circuit arrangement according to claim 1 wherein said coupling means include a first and second capacitor, said first capacitor being connected between said first output terminal of said receiving means and said first input terminal of said reconverting means, said second capacitor being connected between said second output terminal of said receiving means, and said second input terminal of said reconverting means, said capacitors providing DC ground isolation between said receiving means and said reconverting means, said isolation being determined by the breakdown voltage of said capacitors.

4. A circuit arrangement according to claim 3 wherein the capacitance of said capacitors is less than 10 pf.

5. A circuit arrangement according to claim 1 wherein said reconverting means is a detector circuit comprising an input diode having an anode and a cathode, and a transistor having an emitter base and collector, said cathode of said diode being connected to said base, said collector being connected to a supply voltage through a first resistor, means to connect said emitter to said anode of said diode, said emitter being connected to said second ground reference, the output of said detector circuit being obtained across the collector and emitter of said transistor so that when said RF signal is applied across said diode said transistor is always on and in the absence of said RF signal said transistor turns off.

6. A circuit arrangement according to claim 5 wherein said connecting means comprises a resistor.

7. A circuit arrangement according to claim 2 wherein said oscillator circuit includes a first, second, third, fourth and fifth transistor each having an emitter, base and collector, each collector being connected to said digital signal through a resistor, each emitter being connected to said first ground reference, said first collector being connected to said second base, said second collector being connected to said third and fifth base and said third collector being connected to said first and fourth base, said oscillator output being taken between said fourth and fifth collector.

8. A circuit according to claim 1, further comprising, amplifier means coupled to said reconverting means, said amplifier means having the same ground reference as said reconverting means.

9. A circuit according to claim 8 wherein said amplifying means includes a first, second, third, and fourth transistor each having an emitter, base and collector, said first and second emitters each being connected to said second ground reference through a resistor, said second and third collector each being connected to a supply voltage through a resistor, said first collector being connected to said supply voltage, said fourth emitter being connected to said second ground reference, said first emitter being connected to said second base, said second emitter being connected to said fourth base, said second collector being connected to said third base, said third emitter being connected to said fourth collector and said output being taken between said fourth collector and said second ground reference whereby the amplifier output is in phase with said digital signal received by said oscillator circuit.